United States Patent
Echenagucia Cioppa (10) Patent No.: US 11,091,703 B2
(45) Date of Patent: Aug. 17, 2021

(54) THERMAL CRACKING OF CRUDE OIL USING A LIQUID CATALYST TO PREVENT COKE FORMATION AND PROMOTE ALKYLATION

(71) Applicant: Jorge Echenagucia Cioppa, Caracas (VE)

(72) Inventor: Jorge Echenagucia Cioppa, Caracas (VE)

( * ) Notice: Subject to any disclaimer, the term of this patent is extended or adjusted under 35 U.S.C. 154(b) by 0 days.

(21) Appl. No.: 16/576,724

(22) Filed: Sep. 19, 2019

(65) Prior Publication Data
US 2020/0087586 A1 Mar. 19, 2020

Related U.S. Application Data

(60) Provisional application No. 62/733,141, filed on Sep. 19, 2018.

(51) Int. Cl.
| | | |
|---|---|---|
| *C10G 55/00* | (2006.01) | |
| *C10G 55/04* | (2006.01) | |
| *C10G 75/00* | (2006.01) | |
| *B01J 14/00* | (2006.01) | |
| *B01J 19/00* | (2006.01) | |
| *B01D 1/00* | (2006.01) | |
| *G01N 31/10* | (2006.01) | |

(52) U.S. Cl.
CPC .............. *C10G 55/04* (2013.01); *B01D 1/00* (2013.01); *B01J 14/00* (2013.01); *B01J 19/0013* (2013.01); *C10G 75/00* (2013.01); *G01N 31/10* (2013.01); *B01J 2219/00157* (2013.01); *C10G 2300/208* (2013.01); *C10G 2300/301* (2013.01)

(58) Field of Classification Search
CPC ...... C10G 9/007; C10G 55/04; C10G 57/005; C10G 75/00; C10G 2300/208; C10G 2300/301; B01J 14/00; B01J 19/0013; B01J 2219/00157; B01D 1/00; G01N 31/10

See application file for complete search history.

(56) References Cited

U.S. PATENT DOCUMENTS

| | | | | |
|---|---|---|---|---|
| 3,945,435 | A * | 3/1976 | Barry | E21B 43/16 166/267 |
| 4,505,810 | A * | 3/1985 | Plummer | C10G 11/08 208/108 |
| 5,110,447 | A * | 5/1992 | MacWilliams | C10G 9/007 208/106 |
| 5,460,712 | A * | 10/1995 | Lemke | B01J 19/0026 208/48 AA |
| 2005/0258071 | A1* | 11/2005 | Varadaraj | C10G 11/00 208/48 AA |
| 2015/0275084 | A1* | 10/2015 | Das | C10G 75/04 208/125 |
| 2016/0010004 | A1* | 1/2016 | Oehr | C10G 1/00 208/390 |

(Continued)

*Primary Examiner* — Prem C Singh
*Assistant Examiner* — Brandi M Doyle
(74) *Attorney, Agent, or Firm* — Mark Terry (57) ABSTRACT

A system and method for thermal cracking of crude oil is provided. The system includes a plurality of communicatively coupled components configured to support thermal cracking of crude oil and performs a method including a continuous, industrial-sized thermal cracking process used to convert heavy crude oil or extra-heavy crude oil into lighter crude oil, using a liquid catalyst to prevent coke formation and promote alkylation reactions.

5 Claims, 4 Drawing Sheets

(56) References Cited

U.S. PATENT DOCUMENTS

2016/0108324 A1* 4/2016 Johnsen .............. C10G 9/007
                                            166/267
2018/0274347 A1* 9/2018 Ricotta .............. C10G 33/06

* cited by examiner

THERMAL CRACKING OF CRUDE OIL USING A LIQUID CATALYST TO PREVENT COKE FORMATION AND PROMOTE ALKYLATION

CROSS-REFERENCE TO RELATED APPLICATIONS

The present U.S. Utility Patent Application claims priority pursuant to 35 U.S.C. § 119(e) to U.S. Provisional Application No. 62/733,141 entitled "THERMAL CRACKING OF CRUDE OIL USING A LIQUID CATALYST TO PREVENT COKE FORMATION AND PROMOTE ALKYLATION", filed Sep. 19, 2018, which is hereby incorporated herein by reference in its entirety and made part of the present U.S. Utility Patent Application for all purposes.

TECHNICAL FIELD

The technical field relates generally to production of oil and, more specifically, to crude oil conversion processes for converting.

BACKGROUND

Processes for the conversion of heavy hydrocarbon oils to light and intermediate distillates are well known. These heavy hydrocarbon oils can be such materials as petroleum crude oil, atmospheric tar bottoms products, vacuum tar bottoms products, heavy cycle oils, shale oils, coal derived liquids, crude oil residuum, topped crude oils and the heavy bituminous oils extracted from oil sands. Many conversion processes yield substantial amounts of coke as by-product. Coke formation can inhibit further processing and requires downtime to clean out existing coke deposits.

Work has been done to develop additives which can suppress coking reactions or can remove the coke from the reactor. It has been shown, for example, that the addition of coal or coal-based additive results in the reduction of coke deposition during conversion. The coal additives act as sites for the deposition of coke precursors and thus provide a mechanism for their removal from the system. Development of such additives has reduced coke formation. However, the injection of large amounts of additive is costly in various respects, and it is limited in its applications.

Therefore, a need exists for improvements over the prior art, and more particularly for methods and systems that decrease coke formation in the crude oil conversion process while also increasing the efficiency of alkylation processes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claimed embodiments are directed to a more efficient thermal cracking system and method for oil production. The system and method are configured to be integrated into an oil production site, and may comprise a furnace mechanism, a separator drum mechanism, a reactor mechanism, and storage reservoirs all communicatively coupled to support flow or transporting of crude oil throughout said components allowing efficient thermal cracking of the thermal cracking system. The thermal cracking system may include a liquid catalyst configured to be applied to the crude oil in the reactor mechanism in order to generate an optimum oil substance, which comprises a significantly reduced coke formation due to the promoted alkylation reactions amongst the small hydrocarbon radicals formed and the inhibited polymerization reactions.

In one embodiment, a thermal cracking process for oil production is provided that solves the above-described problems. The method includes a continuous, industrial-sized thermal cracking process used to convert heavy crude oil or extra-heavy crude oil into lighter crude oil, using the liquid catalyst to prevent coke formation and promote alkylation reactions.

BRIEF DESCRIPTION OF THE DRAWINGS

The accompanying drawings, which are incorporated in and constitute a part of this disclosure, illustrate various example embodiments. In the drawings.

Like reference numerals refer to like parts throughout the several views of the drawings.

DETAILED DESCRIPTION

The following detailed description refers to the accompanying drawings. Wherever possible, the same reference numbers are used in the drawings and the following description to refer to the same or similar elements. While embodiments herein may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The disclosed embodiments improve over the prior art by providing improved crude oil conversion using a visbreaking process that increases alkylation process efficiency while reducing coke formation. This feature increases light distillate content in the crude, while also reducing the maintenance costs and the variable operational costs associated with coke removal. The disclosed embodiments are also directed to an industrial sized implementation wherein industrial volumes of crude oil may be processed. The disclosed embodiments improve over the prior art by increasing the ability of the visbreaking process to produce lighter crude while also lowering coke formation, using a liquid catalyst, which is easier to obtain and utilize. The disclosed embodiments reduce or eliminate the formation of coke during the thermal cracking process, reduce the required investment for installing said system, and lower the operating costs for the thermal cracking process. The disclosed embodiments also encompass environmentally friendly technology (only liquid or fuel gas combustion emissions are expelled into the atmosphere) and sport a simple process design.

The claimed subject matter is a modification of the visbreaking process that is well known in the art. The visbreaking process is used in crude oil refineries to convert the heavy residue originating from the vacuum distillation process into crude distillates and visbroken residue products. The prior art, however, does not address the issue of using the visbreaking process to upgrade crude oil in the presence of a liquid catalyst that prevents coke formation at an industrial scale plant.

The claimed subject matter converts extra heavy crude oil or heavy crude oil of 8° to 13° API into medium oil having a range of 25° to 28° API. Typically, extra heavy crude oil or heavy crude oil is upgraded through expensive refining processes. The claimed subject matter, however, is a low-cost process that converts the bottom of the barrel into lighter crude at the production oil field or prepares the crude oil to be processed at oil refineries. The claimed subject matter could not only could be used at the oil production field but could be also used to process heavy crude oil and convert it to lighter crude at oil refinery sites. Furthermore, the claimed subject matter is implemented as a plant that is scalable and modular, such that it meets the economic needs of the oilfield. An additional advantage, in the case of extra heavy crude oil or heavy crude oil, is that the claimed subject matter could be applied feeding the crude oil directly from the oil well to the claimed plant, thus reducing the addition of the costly diluent for transportation purposes. Importantly, the use of a liquid catalyst inhibits the polymerization reactions that promote coke formation and promotes the alkylation reactions responsible for the lighter hydrocarbons formation.

Conventionally, the thermal cracking process used for crude upgrading employs delay coking technology, which is a carbon rejection process. Delay coking, however, is associated with certain drawbacks. For example, delay coking is associated with significant coke formation as a byproduct, such as producing over 20% by weight of coke as a byproduct. Coke is a low value product, which is costly to store and ship and which reduces the operational profit margin of the entire oil production operation. Another drawback associated with delay coking is that delay coking units are large scale units installed near port facilities, not the oil production field, for coke disposal. The remote location of said units introduces certain problems into the oil production process.

Hydrogen addition processes like hydrocracking are also available for crude upgrading. Hydrogen addition units, however, require the presence of natural gas to produce hydrogen and the plant investment cost is high.

Figure 1:
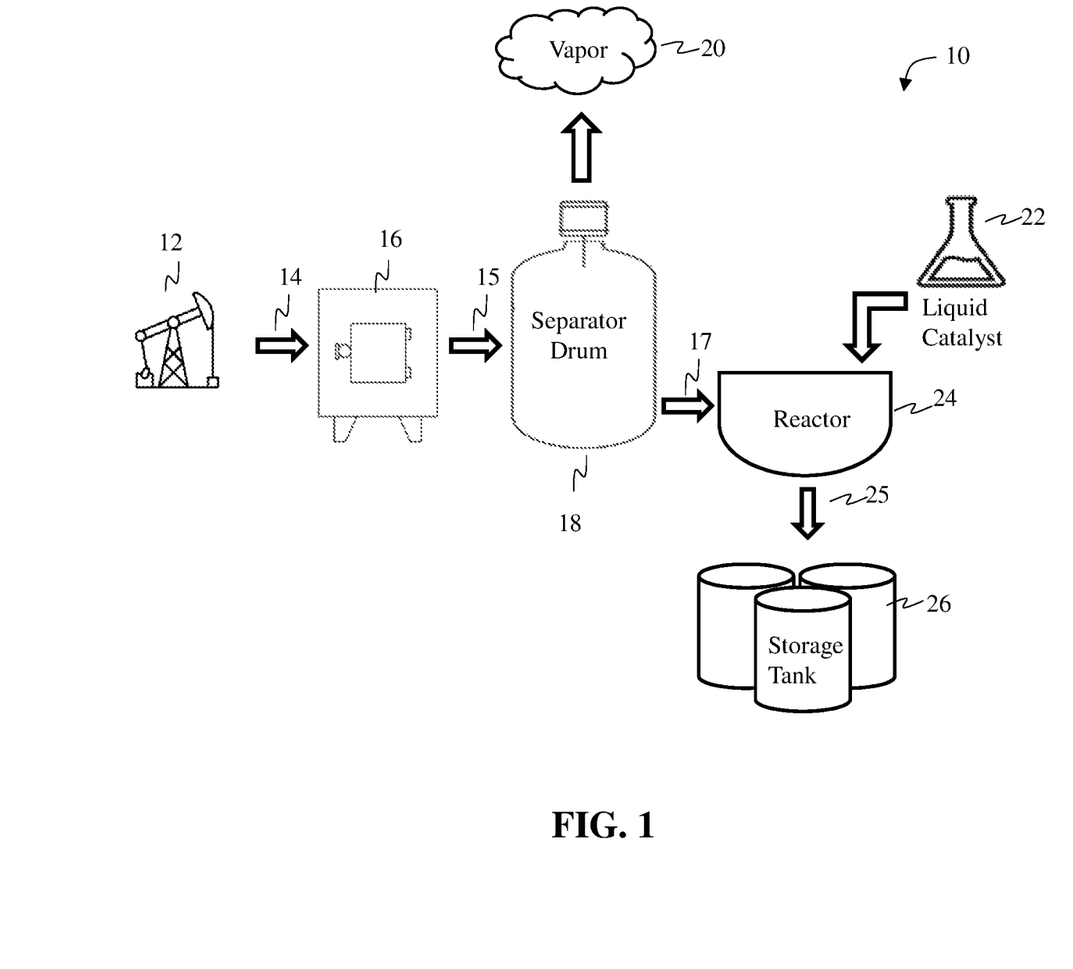
FIG. 1 is an example system in which the techniques described may be practiced according to certain embodiments.

FIG. 1 is a system for a thermal cracking process for oil production that solves the above-described problems, according to an example embodiment. FIG. 1 is an example thermal cracking system 10 configured for the production of crude oil 14 originating from oil well 12 and includes a preheater furnace 16 and a separator drum 18. The preheater furnace is an industrial device used for high-temperature heating of large volumes of crude oil, wherein the heat energy to fuel the furnace may be supplied directly by fuel combustion, electricity, or through induction heating. The industrial furnace may be natural draft furnace, a forced draft furnace or a condensing furnace. The separator drum is a pressure vessel used for separating production fluids into their constituent components of oil, gas and water. The separator drum may include a primary separation device, a secondary gravity settling section, a mist extractor, a gas outlet, a liquid settling section, an oil outlet, a water outlet, a means of controlling an oil level in the separator (such as a liquid level controller and a diaphragm motor valve), a backpressure valve, and pressure relief devices.

Low °API crude (8 to 13° API) oil 14 originating from the oil well 12 enters the preheater furnace 16 where it is heated to about 110° C. Then, the resulting product 15 is transported to a separator drum 18 where the reservoir water and associated natural gas in the crude oil are separated as water vapor 20 and natural gas through the top of the separator drum 18, and the pre-heated crude oil 17 flows via the bottom of the separator drum 18 to a tubular furnace oven reactor 24. The reactor is an enclosed volume in which a chemical reaction takes place. The reactor may be an oven type reactor and may be a cylindrical and sealed container made of metal, such as steel. The temperature inside the reactor is controlled at a variety of ranges but includes the ability to reach at least 500° C.

Upon entering the tubular furnace oven reactor 24, the pre-heated crude oil 17 is mixed with a liquid catalyst 22, before it is heated to 450 to 500° C. in the tubular furnace oven reactor 24. In one embodiment, the reactor residence time is a minimum of four minutes. At this point, the crude oil is transformed into an upgraded crude oil at 450-500° C. or optimum oil substance, which is cooled with virgin crude oil fed to the tubular furnace oven reactor 24 (from the separator drum 18). In one embodiment, the cooling of the optimum oil substance is accomplished via a heat recovery heat tube and shell exchanger. The resulting upgraded oil 25 is then transported to the storage tanks 26 for storage.

The liquid catalyst 22 may be made of a combination of organic and inorganic compounds mixed in a liquid form. The liquid catalyst 22 is configured to: 1) prevent (inhibit) the polymerization reactions that normally occur during thermal cracking, 2) promote the alkylation reactions amongst the small hydrocarbon radicals formed during the thermal cracking reactions, and 3) prevent the coke formation nuclei in the reactor tube walls. The liquid catalyst 22 dosage depends on the crude nature but is approximately 5.000 to 8.000 ppm.

During the cracking process, about 60% of the initial sulphur content present in the crude oil are converted to hydrogen sulfide ($H_2S$) and the original viscosity of the crude oil is reduced to 70%. Depending on the size of the plant, the hydrogen sulfide could be neutralized with sodium carbonate or it could be converted into solid sulphur using a Clauss process. The upgraded oil 25 of about 28° API crude is cooled to 40° C. and is stored in storage tanks 26 (seen at the bottom of the figure) for further use of commercialization.

With regard to experimental results, in year 2018-2019, continuous heavy crude oil processing pilot plants that encompass the claimed subject matter were built and installed at a tank farm located a crude oil production field located in Ciudad Ojeda, Zulia State in Venezuela. The industrial sized plant was able to upgrade heavy or extra heavy crude oil from 11° API to 21° API. The result could have been more efficient, but there were limitations in the heat content of the gas-oil fuel used in the furnace reactor that limited the reaction temperature to 400° C. The bench sized plant was able to convert the same heavy or extra heavy crude oil from 11° to 29° API because of the ability to increase reactor temperature to the required level. Said pilot plants serve as proof of concept that the claimed process works at the bench size scale and at the industrial size scale.

In one embodiment, the thermal cracking system 10 may be implemented in hardware, software, or a combination of hardware and software. In some embodiment, the various components of the thermal cracking system 10 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. The thermal cracking system 10 illustrates only one of many possible arrangements of components configured to perform the functionality described herein. Other arrangements may include fewer or different components, and the division of work between the components may vary depending on the arrangement.

For example, a computing device or computer system (as described more fully below), can be communicatively coupled to a device, such as a pump station and/or valve(s), that transport the crude oil 14 from the well 12 to the furnace 16, so as to activate and regulate transport of the crude oil 14 in the required amounts and at the necessary times and time periods. A computing device can be communicatively coupled to furnace 16 itself to activate and regulate the heating of the crude oil 14 to about 110° C. A computing device can be communicatively coupled to a device, such as a pump station and/or valve(s), that transport the crude oil 15 from the furnace 16 to the separator drum 18, so as to activate and regulate transport of the crude oil 15 in the required amounts and at the necessary times and time periods. A computing device can be communicatively coupled to separator drum 18 itself to activate and regulate the separation of the crude oil 14 into reservoir water and associated natural gas as water vapor 20 and natural gas through the top of the separator drum 18. A computing device can be communicatively coupled to a device, such as a pump station and/or valve(s), that transport the crude oil 17 from the separator drum 18 to the reactor 24, so as to activate and regulate transport of the crude oil 17 in the required amounts and at the necessary times and time periods. A computing device can be communicatively coupled to reactor 24 itself to activate and regulate the reaction with the liquid catalyst and the reactor residence time. A computing device can be communicatively coupled to a device, such as a pump station and/or valve(s), that transport the liquid catalyst 22 to the reactor 24, so as to activate and regulate transport of the liquid catalyst 22 in the required amounts and at the necessary times and time periods. A computing device can be communicatively coupled to storage tanks 26 themselves to measure amounts and times.

In one embodiment, the claimed subject matter includes a modular, industrial-scale, thermal cracking process, configured for installation at an oil production site including an oil well, wherein crude oil is fed directly from the oil well into a thermal cracking processing plant, thus improving the profitability of the crude oil producer. In another embodiment, the claimed subject matter includes a modular, industrial-scale, thermal cracking process, configured for installation at a crude oil refinery wherein heavy or extra heavy crude oil is upgraded to a lighter crude before being fed to the atmospheric distillation plant, thus increasing the refining margin. In another embodiment, the claimed subject matter includes a modular, industrial-scale, thermal cracking process, configured for reducing by 60% the initial sulphur content of the crude oil to be processed, and/or configured for reducing by 80% the initial acid number or acidity of the crude oil to be processed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Introducing a first embodiment of the invention, the present invention consists of a method for thermal cracking for oil production comprising heating a base oil to a first designated heating temperature; based on the base oil reaching the first designated heating temperature, generating an oil-based essence substance; transporting the oil-based essence substance to a drum configured to generate a modified oil-based essence substance; filtering, via the drum, the oil-based essence substance in order to generate the modified oil-based essence substance; transporting the modified oil-based essence substance to a reactor configured to support application of a liquid catalyst to the modified oil-based essence substance; heating the reactor to a second designated heating temperature; and based on the reactor reaching the second designated heating temperature, generating an optimum oil substance configured to be cooled and stored in one or more reservoirs.

Introducing a second embodiment of the invention, the present invention consists of a system for a thermal cracking process for oil production comprising: a preheater furnace configured to: heat a base oil to a first designated heating temperature; and generate an oil-based essence substance based on the base oil reaching the first designated heating temperature; a drum configured to: filter the oil-based essence substance; and generate a modified oil-based essence substance; a reactor configured to: apply a liquid catalyst to the modified oil-based essence substance; generate an optimum oil substance based on the liquid catalyst and the modified oil-based essence substance; heat the optimum oil substance to a second designated heating temperature; and a reservoir configured to: retain the optimum oil substance upon cooling of the optimum oil substance.

Introducing a third embodiment of the invention, the present invention consists of one or more storage media storing instructions which, when executed by one or more processor, cause: heating a base oil to a first designated heating temperature; based on the base oil reaching the first designated heating temperature, generating an oil-based essence substance; transporting the oil-based essence substance to a drum configured to generate a modified oil-based essence substance; filtering, via the drum, the oil-based essence substance in order to generate the modified oil-based essence substance; transporting the modified oil-based essence substance to a reactor configured to support application of a liquid catalyst to the modified oil-based essence substance; heating the reactor to a second designated heating temperature; and based on the reactor reaching the second designated heating temperature, generating an optimum oil substance configured to be cooled and stored in one or more reservoirs.

In one embodiment, the thermal cracking system 10 may be implemented by a network of communicatively coupled computing devices configured to be integrated into an oil production site, and communicatively coupling components of the thermal cracking system 10 in order to ensure efficient transport or flow of crude oil 14 throughout components of the thermal cracking system 10. The network may be configured to access computers, databases, and devices outside of the thermal cracking system 10.

Figure 2A:
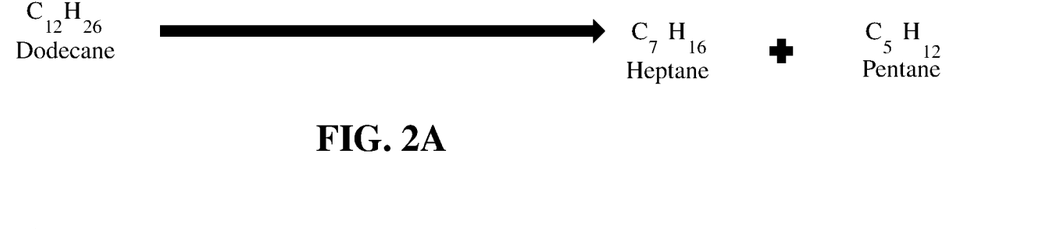
FIGS. 2A-C are example chemical formulae illustrating molecular evolution under process for thermal cracking of crude oil using a liquid catalyst.
Figure 2B:
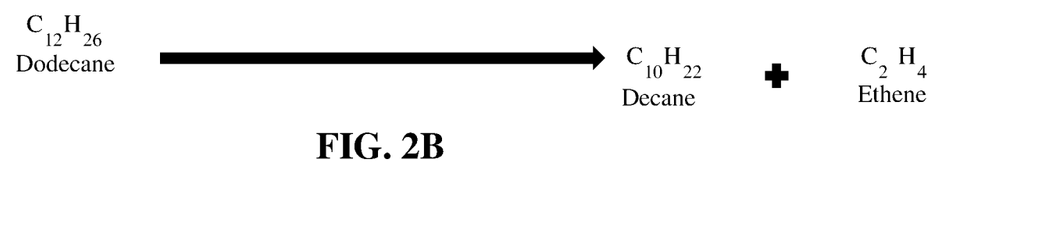
Figure 2C:
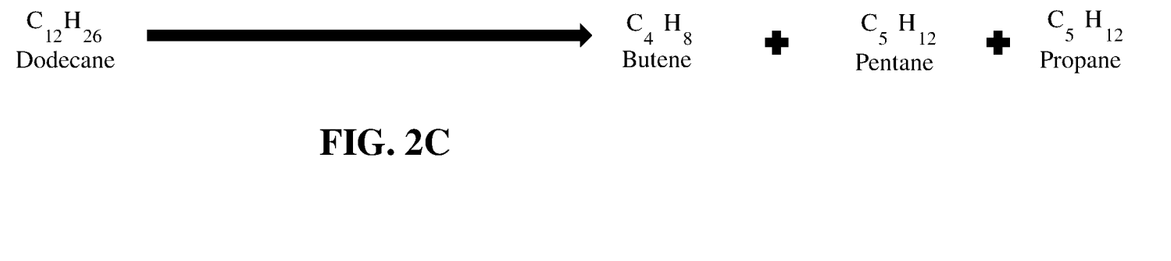

FIGS. 2A-2C are examples illustrating chemical formulae associated with molecular evolution of hydrocarbons due to the thermal cracking system 10. In one embodiment, crude oil 14 comprises a plurality of hydrocarbons configured to support different carbon chain lengths. For example, crude oil 14 undergoing the full process associated with the thermal cracking system 10 will result in a plurality of hydrocarbons of shorter length. In some embodiments, thermal cracking system 10 is configured to break down long chain alkanes into smaller alkane and alkene molecules. FIG. 2A depicts dodecane ($C_{12}H_{26}$) being broken down into heptane ($C_7H_{16}$) and pentane ($C_5H_{12}$) via thermal cracking system 10.

FIG. 2B depicts dodecane ($C_{12}H_{26}$) being broken down into decane ($C_{10}H_{22}$) and ethene ($C_2H_4$) via thermal cracking system 10. FIG. 2C depicts dodecane ($C_{12}H_{26}$) being broken down into butene ($C_4H_8$), pentane ($C_5H_{12}$), and propene ($C_3H_6$) via thermal cracking system 10. In some embodiments, the liquid catalyst 22 is configured to break down the bonds of the plurality of hydrocarbons to generate molecules comprising 5-10 carbons in the chain. The liquid catalyst 22 is also configured to prevent polymerization reactions that lead to coke formation in the conversion process of crude oil 14, and also increase the efficiency of alkylation processes.

Figure 3:
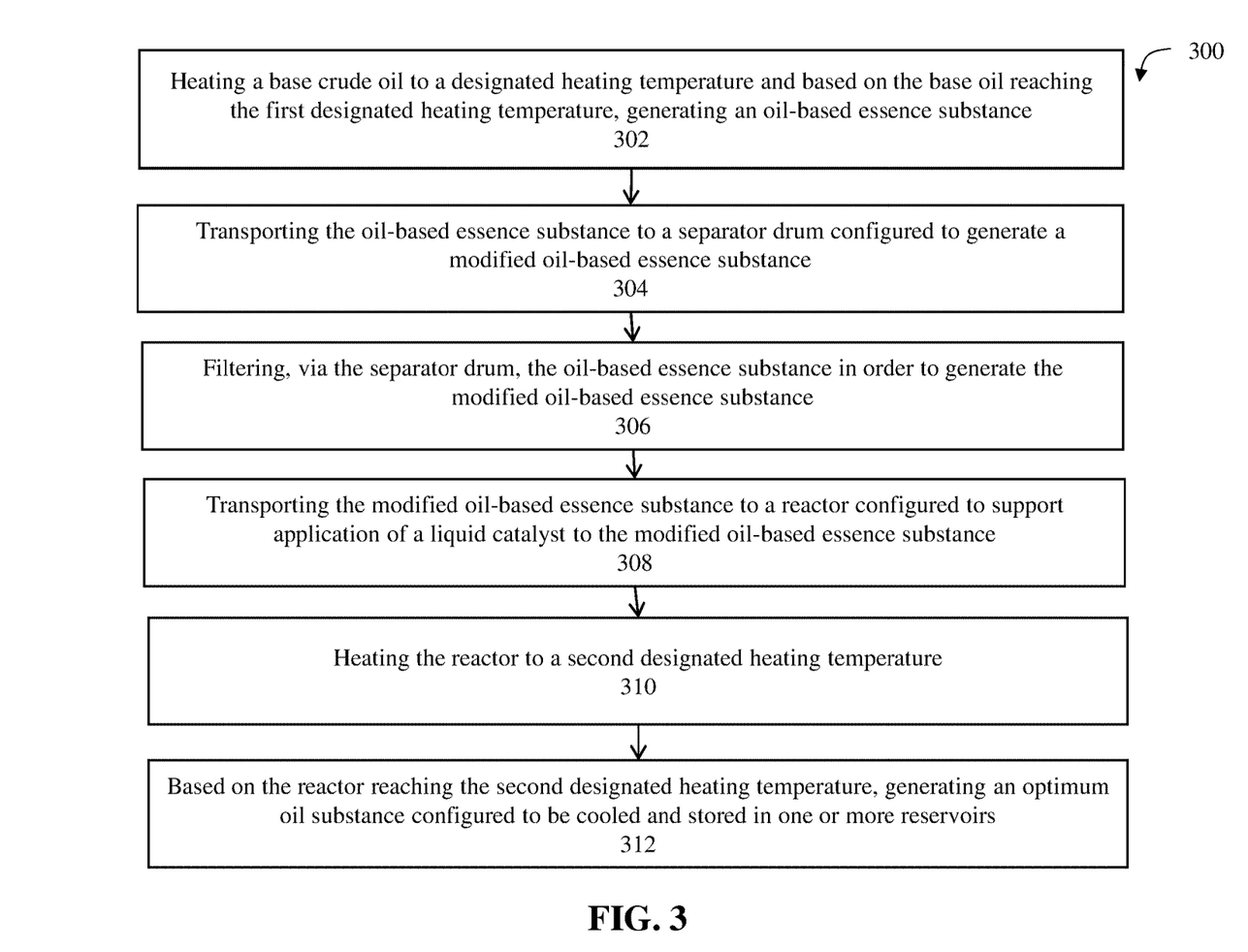
FIG. 3 is a block diagram that depicts a process for thermal cracking of crude oil using a liquid catalyst.

Referring now to FIG. 3, an exemplary embodiment of a method 300 of implementing the thermal cracking system 10 is illustrated. At step 302, crude oil 14 originating from oil well 12 is heated by the preheater furnace 16. In one embodiment, crude oil 14 may enter method 300 as extra-heavy crude oil or heavy crude oil (API Gravity of 8°-13°. Once crude oil 14 reaches a temperature of about 110° C., then step 304 occurs in which crude oil 15 flows or is transported from the preheater furnace 16 to the separator drum 18. In one embodiment, the flow of crude oil 15 may be converted from mist flow to annular flow before entering separator drum 18 in order to support coalescing liquid droplets and extraction during the vapor phase. At step 306, reservoir water and any applicable natural gases are separated or filtered from crude oil 15 as water vapor 20 and released from the separator drum 18 via an enclosable aperture. In one embodiment, the separator drum 18 may be configured to discern various types of water vapor 20 based on boiling point or any other applicable attribute. At step 308, crude oil 17 flows or is transported to the tubular furnace oven reactor 24 in which crude oil 17 is mixed with the liquid catalyst 22.

In one embodiment, the liquid catalyst 22 is applied to the crude oil 17 within the tubular furnace oven reactor 24 in a dosage ranging from about 5.000 ppm to 8.000 ppm. At step 310, the tubular furnace oven reactor 24 is heated to about 450 to 500° C. At step 312, once the crude oil 17 and the liquid catalyst 22 are heated to about 450 to 500° C. then the optimum oil substance is generated and the tubular furnace oven reactor 24 avoids coke formation nuclei within the tubular walls. During step 312, any hydrogen sulfide byproduct of method 300 is either neutralized with sodium carbonate or converted into solid sulphur using a Clauss process. In some embodiments, the optimum oil substance 25 is medium API crude oil (API Gravity 25° to 28° and is required to be stored in the tubular furnace oven reactor 24 for at least four minutes. The optimum oil substance 25 comprises a significantly reduced coke formation due to the promoted alkylation reactions amongst the small hydrocarbon radicals formed and the inhibited polymerization reactions. The optimum oil substance may be cooled down by introduction of virgin crude oil fed from within the separator drum 18 or any other applicable component comprising remaining crude oil 14 or cooled down in the furnace oven reactor 24 via heat recovery heat tube and shell exchanger. In one embodiment, once the optimum oil substance 25 is cooled down to about 40° C. it is configured to be stored in one or more storage tanks 26.

In one embodiment, the effectiveness of the liquid catalyst 22 can be determined based upon one or more analyses, which may be achieved via utilizing a blanc stainless steel cupon, plaque, or any other enclosable panel within the tubular furnace oven reactor 24, and subjecting both crude oil 14 and liquid catalyst 22 to about 470° C. for one-hour reaction time. The cupon or plaque may then be immersed into n-hexane after the reaction in order to reduce residue and a comparison can made between the current weight of the cupon or plaque and the weight prior to the reaction in order to determine the coke formation rate. In one embodiment, applicable measurements may be operated using ASTM D-4294-03 or any other applicable ASTM distillation method.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
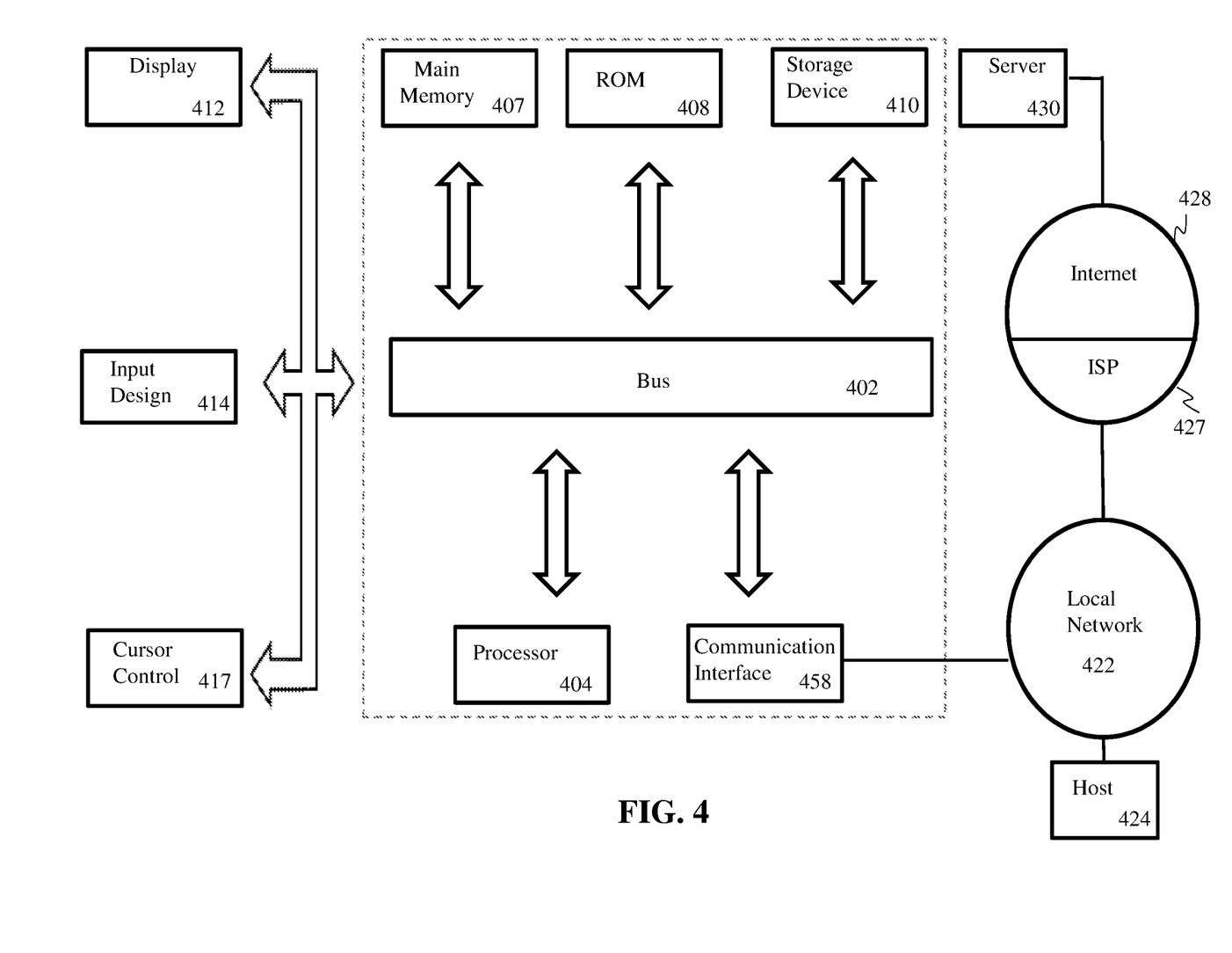
FIG. 4 is a block diagram that illustrates a computer system upon which an embodiment of the invention may be implemented.

For example, FIG. 4 is a block diagram that illustrates a computer system 400 (or computing device) upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 514, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for thermal cracking of crude oil, the method comprising:
   heating a base crude oil to a first designated heating temperature of approximately 110° C.;
   based on the base oil reaching the first designated heating temperature, generating an oil-based essence substance;
   transporting the oil-based essence substance to a separator drum configured to generate a modified oil-based essence substance;
   filtering, via the separator drum, the oil-based essence substance in order to generate the modified oil-based essence substance;
   transporting the modified oil-based essence substance to a reactor configured to support application of a liquid catalyst to the modified oil-based essence substance;
   applying a dosage within a range of 5.000 ppm to 8.000 ppm of the liquid catalyst to the modified oil-based essence substance in the reactor;
   heating the reactor to a second designated heating temperature within a range of 450 to 500° C.;
   based on the reactor reaching the second designated heating temperature, holding the modified oil-based substance and liquid catalyst in the reactor for a minimum reaction time of four minutes, and generating an optimum oil substance; and
   cooling the optimum oil substance and storing it in one or more reservoirs.

2. The method of claim 1, wherein the step of cooling the optimum oil substance further comprises:
   adding a plurality of virgin crude oil to the reactor; and
   cooling the optimum oil substance via the plurality of virgin crude oil.

3. The method of claim 1, wherein the step of cooling the optimum oil substance further comprises:
   storing the optimum oil substance in one or more reservoirs once the optimum oil substance is cooled to at least 40° C.

4. The method of claim 1 further comprising:
   determining effectiveness of the liquid catalyst in the optimum oil substance by containing the optimum oil substance within a durable enclosed panel and exposing the optimum oil substance to a testing heating temperature at about 470° C. for at least an hour.

5. The method of claim 4 further comprising:
   immersing the durable enclosed panel in a plurality of n-hexane and measuring a present residue comprised on the durable enclosed panel.

* * * * *